June 5, 1962 J. H. LEGO 3,037,687

COMBINED COMPARATOR AND INDICATOR

Filed May 12, 1960

INVENTOR
JOHN H. LEGO
BY Donald F. Voss
ATTORNEY

United States Patent Office 3,037,687

Patented June 5, 1962

3,037,687

COMBINED COMPARATOR AND INDICATOR

John H. Lego, Shokan, N.Y., assignor to International Business Machines Corporation, New York, N.Y., a corporation of New York Filed May 12, 1960, Ser. No. 28,693
11 Claims. (Cl. 234—34)

This invention relates to indicating and comparing devices and, particularly, to error indicating and data comparing devices for record card controlled accounting or statistical machines.

This invention is an improvement over devices heretofore known for detecting and indicating errors, for instance, between a pattern record card and a reproduced record card in a machine for reproducing record cards, as described in the patent to C. D. Lake, No. 2,032,805, granted on March 3, 1936, for Perforating Machine. The machine therein described has been improved to include mechanism described in the patent to C. D. Lake, No. 2,174,702, dated October 3, 1939, for interrupting the operation of the machine and for lighting a lamp when disagreement is found between the pattern card and the card being reproduced. Provision was also had for operating an indicating finger to indicate the column in which the error occurred.

The present invention is an improvement which provides improved visual indication of the column in which the error occurred. Furthermore, the device functioning to provide visual column error indication also acts to detect the occurrence of the error. Heretofore, the error indicating devices were separate devices and played no part in detecting the errors. They merely represented the fact that an error existed. Other devices were necessary to detect the errors. Of course, such an arrangement of apparatus is much more expensive than that of the present invention where the device detecting the error also indicates that an error exists and indicates the exact location of the error.

Accordingly, a prime object of the invention is to provide improved apparatus for comparing data represented by electrical impulses.

Another object of the invention is to provide apparatus which will detect and visually indicate discretely errors resulting during a data comparison operation.

Still another object of the invention is to provide apparatus for indicating data comparison errors which is relatively inexpensive.

The foregoing and other objects, features and advantages of the invention will be apparent from the following more particular description of a preferred embodiment of the invention. as illustrated in the accompanying drawings.

Figure 2:
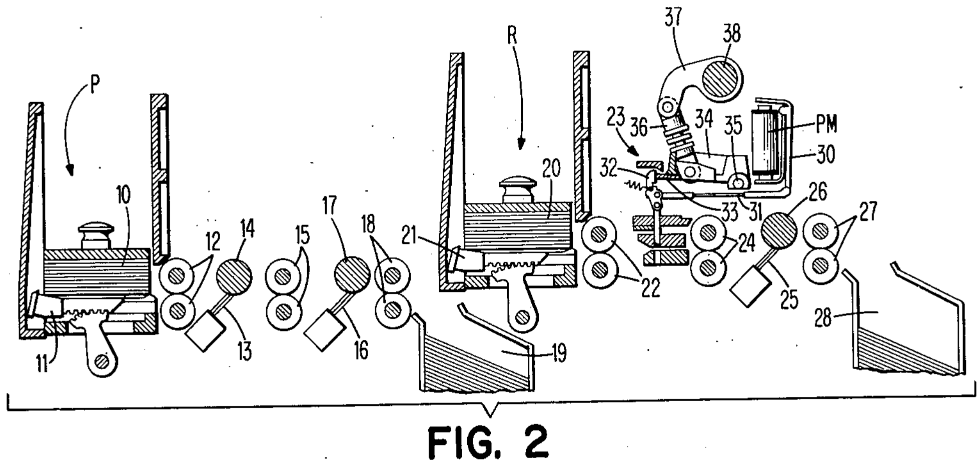
FIG. 2 is a sectional view of the pattern card sensing and blank card punching mechanisms of the machine incorporating the instant invention.

With reference to the drawings for purpose of example, FIG. 2 illustrates a machine incorporating the invention. The machine shown in FIG. 2 includes the essential elements of the record card perforating or reproducing machine disclosed in Patent No. 2,032,805. A brief description of this machine will first be given to facilitate an understanding of the present invention.

In FIG. 2, pattern cards 10 are contained in a card hopper P and blank cards 20, which are to be punched, are in a card hopper R. The blank cards 20 are to be punched according to the perforations entered in the pattern card. After a punching operation takes place, the punched card 20 is compared with its associated pattern card 10. If no error occurs during the comparing operation, the machine continues to function. However, if an error occurs due to lack of comparison, the error is detected and indicated and the machine is caused to stop operating. It then becomes an easy matter for the machine operator to remove both the pattern card 10 and punched card 20, which failed to correspond with each other, note the error and then restart the machine.

The pattern cards 10 are picked in seriatim from the card hopper P in the conventional manner by a picker knife 11 which advances the cards 10 to a first pair of cooperating feed rollers 12. The feed rollers 12 advance the cards 10 relative to a first sensing station comprising sensing brushes 13 and contact roller 14. A second pair of cooperating feed rollers 15 are situated to receive the record cards 10 from the feed rollers 12. The feed rollers 15 advance the cards 10 between sensing brushes 16 and contact rollers 17 disposed at a second sensing station. As the record cards 10 emerge from the second sensing station, they encounter a third pair of cooperating feed rollers 18 which advance the cards to a drop-type card stacker 19.

Likewise, the blank cards 20 are picked in seriatim from the card hopper R by a picker knife 21. The picker knife 21 advances the cards 20 to a first pair of cooperating feed rollers 22 which, in turn, advance the cards 20 relative to a punch unit 23 located at a punch station in cooperation with a pair of cooperating feed rollers 24. The cards 20 are advanced through the punching station in increments. The feed rollers 22 and 24 are intermittently driven to advance the cards in increments with each row of index positions pausing momentarily in the punching position to receive a perforation if, at such time, the associated magnet PM is energized.

The feed rollers 24 convey the cards 20 to a sensing station comprising sensing brushes 25 and contact roller 26. The cards 20 continue from the sensing station to a pair of cooperating feed rollers 27 which convey the cards to card stacker 28.

Energization of the magnet PM rocks its armature structure 30, drawing a link 31 toward the right, to effect coupling between an interposer 32 and a plate 33. The plate 33 is carried by a member 34 pivoted at 35 and oscillated by means of a link 36, connected to an arm 37 on shaft 38. As the pattern card 10 passes between sensing brushes 13 and contact roller 14, circuits are completed through perforations in the pattern card 10 to energize corresponding punch magnets PM. The punch magnets, upon being energized, couple the related punches to the oscillating plate 33 and effect punching in the corresponding index position of the blank card 20. After the pattern card 10 and the card 20 have simultaneously passed their respective sensing and punching stations, they simultaneously pass row position by row position the sets of sensing brushes 16 and 25, respectively.

The present invention enables the simultaneous comparison between data recorded in the pattern cards 10 and data entered into the cards 20. If the data entered into the cards 20 fails to compare with data entered in corresponding index positions in the pattern card, the index position or positions where the error or errors occur are visually noted and the machine is stopped.

Figure 1:
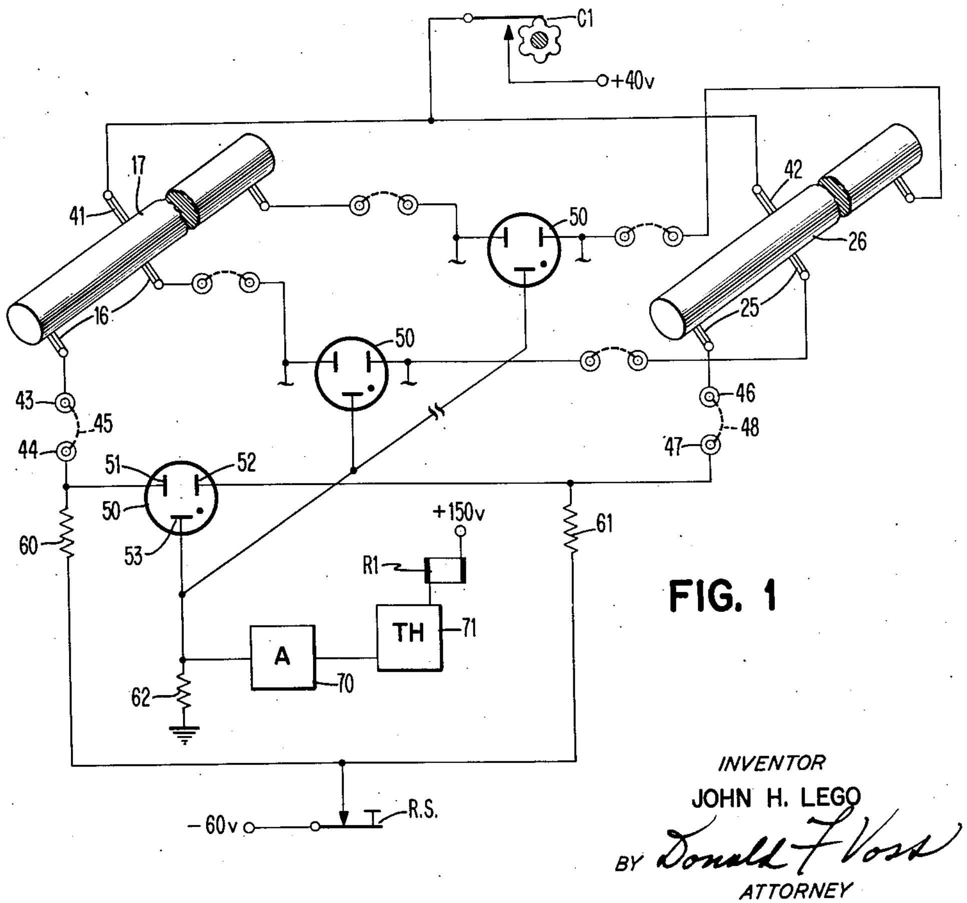
FIG. 1 is a schematic circuit diagram of the invention.

For comparing data at each index position of a row of index positions of a pattern card 10 with data at each index position of a row of index positions of a card 20, eighty neon gas-filled tubes 50, each having three elements, are provided, as shown in FIG. 1. The contact rollers 17 and 26 are electrically connected in parallel through the facility of brushes 41 and 42, respectively, to a positive 40 volt D.C. supply through a contact C1 operated by a multilobe cam. The sensing brush 16 for one of the index positions is selectively connectable through plug hubs 43 and 44 and jumper wire 45 to an electrode 51 of one of the tubes 50 and to a current limiting resistor 60. The current limiting resistor 60 is connected to a negative 60 volt D.C. supply through a reset switch RS. Similarly, the sensing brush 25 for the corresponding index position is selectively connectable through plug hubs 46 and 47 and jumper wire 48 to an electrode 52 of said one of the tubes 50 and to a current limiting resistor 61. The current limiting resistor 61 is also connected to the negative 60 volt D.C. supply through the reset switch RS. An electrode 53 of said one of the tubes 50 is connected to ground potential through a resistor 62 of relatively low value and to the input of an amplifier 70. Resistor 62 functions to keep the error detection voltage low because this voltage, due to the electrical connections, appears at the electrode 53 of each of the other tubes 50. The output of the amplifier 70 is connected to the input of a thyratron 71 having a relay R1 connected in its plate circuit. The relay R1 controls normally closed contacts, not shown, which, upon being opened; i.e., when the relay R1 is energized, will stop the machine.

The characteristics of the 3-element neon gas-filled tubes are such that the gas becomes ionized when there is a potential difference of approximately 100 volts between any of the electrodes 51, 52 and 53. Of course, when the gas becomes ionized, the tubes become luminous. Generally, tubes of this type utilize a trigger electrode for starting the ionization; however, in the tubes 50, none of the electrodes 51, 52, 53 act as a trigger electrode. By this arrangement, when a perforation is not present at the index position being sensed in both the cards 10 and 20, the electrodes 51 and 52 are each at a potential of approximately negative 60 volts. Since the electrode 53 is at ground potential, the voltage between any two electrodes of the electrodes 51, 52 and 53 is only 60 volts and the tube 50 will not ignite. This bias voltage of approximately 60 volts is about midway between the igniting or starting voltage and the extinguishing voltage for the tubes 50. Likewise, if a perforation is present at the index position being sensed in both of the cards 10 and 20, the electrodes 51 and 52 are each at a potential of approximately positive 40 volts. Hence, since the electrode 53 is at ground potential, the voltage between any two electrodes of the electrodes 51, 52, 53 is only 40 volts and the gas in the tube 50 will not be ionized. Of course, under these conditions, the tube 50 will not be conducting any current; and, therefore, there will not be a signal on the input of the amplifier 70.

However, if a perforation is present at the index position being sensed in card 10, but not in card 20, or vice versa, the electrode 51 will be at approximately a positive 40 volts while the electrode 52 is at approximately a negative 60 volts, or vice versa. Of course, the electrode 53 will be initially at ground potential. Hence, there is a potential difference of approximately 100 volts between electrodes 51 and 52. Whichever electrode is at the negative voltage is the cathode while the one at the positive voltage is the anode. This potential difference is sufficient to cause ionization of the gas in tube 50, which then will conduct current. This causes the voltage of electrode 53 to rise, thus producing a signal on the input of the amplifier 70. The amplifier 70 amplifies the signal which then passes on to the thyratron 71 to fire the same. Firing of the thyratron 71 causes the relay R1 to become energized. With relay R1 energized, the normally closed contacts, not shown, are opened to stop the machine. Hence, the tube 50 acted to detect the comparison error; to indicate, upon igniting, the column position in which the error took place; and to stop the machine. The comparison error provides a voltage impulse having a duration of approximately 13 milliseconds; but once the tube 50 is ignited or ionized, it remains ignited until reset switch RS is opened, because, after the voltage pulse provided by the comparison error goes away, the electrode

53 acts as the anode while either or both of the electrodes 51 and 52 act as the cathode. When the reset switch RS is opened, the tube 50 is extinguished.

From the above, it is seen that the invention provides a device having the combined function of comparing data and visually indicating the existence of an error if the data checked does not compare equal. Because of this arrangement, it is further seen that the apparatus embodying the present invention is relatively inexpensive.

While the invention has been particularly shown and described with reference to a preferred embodiment thereof, it will be understood by those skilled in the art that various changes in form and details may be made therein without departing from the spirit and scope of the invention.

What is claimed is:

1. In a record card controlled machine, a pair of sensing devices connected to a predetermined potential so as to emit a signal upon sensing perforations in record cards; a neon gas-filled tube having first, second and third electrodes; means for biasing said first electrode at a predetermined electrical potential; means for biasing said second and third electrodes at an equal predetermined electrical potential, whereby the potential difference between any of said first, second and third electrodes is insufficient to ionize the neon gas to cause the tube to conduct; means for connecting one of said sensing devices to said second electrode to vary the potential thereof when a signal is emitted upon sensing a perforation; and means for connecting the other sensing device to said third electrode to vary the potential thereof when a signal is emitted upon sensing a perforation, whereby the neon gas in said tube becomes ionized and the tube conducts when the potential of said second and third electrodes is non-simultaneously varied.

2. In a record card controlled machine according to claim 1 further comprising means operably controlled by said tube for actuating the machine stop controls when said tube conducts.

3. In a record card controlled machine as in claim 2 wherein said first electrode is biased at ground potential, said second and third electrodes are biased at an equal negative potential and said pair of sensing devices are connected to a positive potential so as to emit a positive signal upon sensing perforations in the cards.

4. In a record card controlled machine, a first sensing device for sensing column index positions of record cards bearing data in the form of perforations and to emit signals upon sensing perforations in said column index positions; means for connecting said first sensing device to a predetermined positive potential in a timed relationship to the passage of said column index positions relative to said first sensing device; a second sensing device for sensing simultaneously with said first sensing means column index positions of record cards bearing data in the form of perforations and to emit signals upon sensing perforations in said column index positions; neon gas tubes corresponding to said column index positions of said record cards, each tube having first, second and third electrodes, means for biasing said first electrode of each tube at a predetermined electrical potential; means for biasing said second and third electrodes of each tube at an equal predetermined electrical potential; means for connecting said first sensing means to said second electrodes of said tubes to vary the potential thereof upon sensing perforations; and means for connecting said second sensing means to said third electrodes of said tubes to vary the potential thereof upon sensing perforations, whereby any of said tubes are rendered conductive upon either of said first and second sensing devices sensing a perforation in any column index position and one of said first and second sensing devices failing to sense a perforation in said any column index position.

5. In a record card controlled machine as in claim 4 wherein said first electrodes of the tubes are biased at ground potential.

6. In a record card controlled machine as in claim 4 wherein said first electrodes are commonly connected to ground potential through a common resistor.

7. In a record card controlled machine as in claim 4 wherein said second and third electrodes for each tube are commonly connected to a negative potential.

8. In a record card controlled machine as in claim 7 wherein said second and third electrodes for each tube are connected to said negative potential through current limiting resistors.

9. In a record card controlled machine as in claim 8 wherein said first and second sensing devices emit signals of a positive potential of a predetermined duration upon sensing perforations in the column index positions of the record cards being sensed thereby.

10. In a reproducing punching machine having a pair of sensing devices for sensing record cards bearing data in the form of perforations, said sensing devices being adapted to emit signals upon sensing perforations; means for feeding a perforated pattern card past one of said sensing devices; means for feeding a reproduced card past the other sensing device concurrently with the passage of said pattern card past said one of said sensing devices;

a neon gas tube having first, second and third electrodes for each pair of card columns; means for biasing said first electrode at a predetermined electrical potential; means for biasing said second and third electrodes at an equal predetermined electrical potential; means for connecting said one of said sensing means to said second electrode to vary the electrical potential thereof upon sensing a perforation; and means for connecting said other sensing means to said third electrode to vary the electrical potential thereof upon sensing a perforation, said tube for each pair of card columns being rendered conductive upon either of said pair of sensing devices sensing a perforation and one of said pair of sensing devices failing to sense a perforation.

11. In a reproducing machine according to claim 10 further comprising means operably controlled by said tube to activate controls for stopping the machine upon said tube being rendered conductive.

References Cited in the file of this patent

UNITED STATES PATENTS 2,174,702 Lake ------------------ Oct. 3, 1939

FOREIGN PATENTS 1,040,597 Germany --------------- Oct. 9, 1958